H. R. C. ANTHONY.
AUTOMOBILE VENTILATOR.
APPLICATION FILED JAN. 7, 1921.
1,408,431.
Patented Mar. 7, 1922.
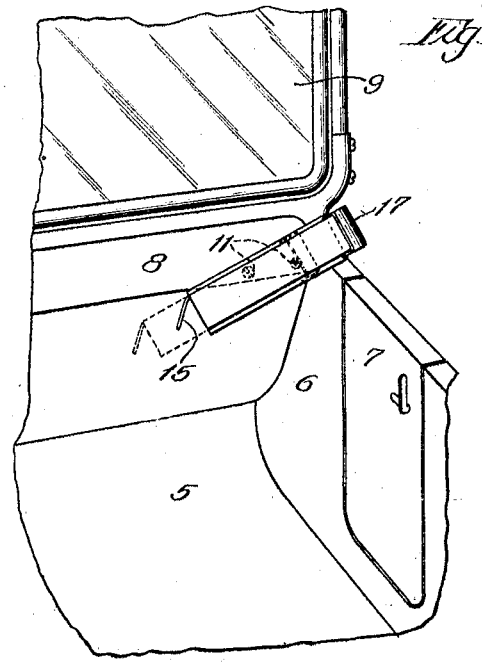
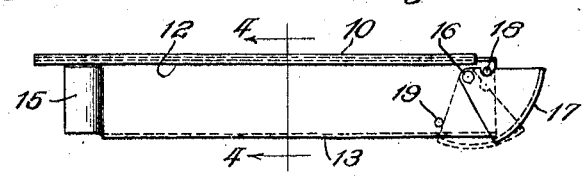
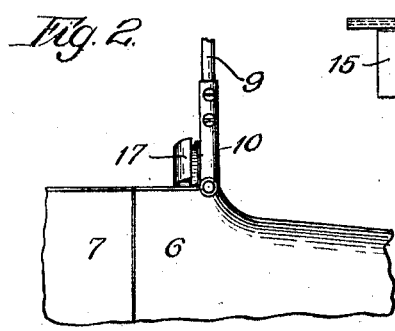
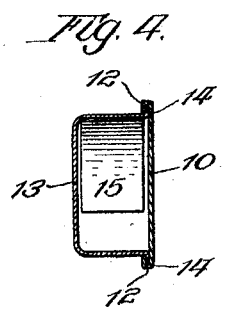
Inventor:
Herman R. C. Anthony.
By: Samuel N. Pond
Atty.

UNITED STATES PATENT OFFICE.

HERMAN R. C. ANTHONY, OF MADISON, WISCONSIN.

AUTOMOBILE VENTILATOR.

1,408,431.  Specification of Letters Patent.  Patented Mar. 7, 1922.

Application filed January 7, 1921. Serial No. 435,577.

*To all whom it may concern:*

Be it known that I, HERMAN R. C. ANTHONY, a citizen of the United States, residing at Madison, in the county of Dane and State of Wisconsin, have invented certain new and useful Improvements in Automobile Ventilators, of which the following is a specification.

This invention relates to improvements in ventilators for automobiles and other motor vehicles. It is well known that the foot space of the front seat of an automobile frequently becomes uncomfortably warm from the heat of the engine, especially in warm weather, and various devices in the nature of ventilators have heretofore been proposed for cooling and ventilating this foot space without necessitating opening of the front doors of the car body.

The main object of the present invention is to provide a simple, inexpensive and practical device in the nature of an attachment which may be applied to any car and shall efficiently serve the purpose of a ventilator for the foot space. Other objects are, to provide a ventilating device which can be placed in or out of service, as desired, without necessitating its application to and removal from the car; to provide a ventilating device wherein the inflow of the cooling air can be regulated as desired; and to provide a ventilating device wherein the direction of the discharged air within the foot space of the car may be controlled as desired.

Other objects and attendant advantages of the invention will be readily apparent to persons familiar with the art as the same becomes better understood by reference to the following detailed description, taken in connection with the accompanying drawing wherein I have illustrated one practical and approved embodiment of the invention, and in which—

Fig. 1 is a perspective interior elevation of the right hand front corner portion of an automobile body, showing my improved ventilator applied thereto;

Fig. 2 is a fragmentary side elevation as viewed from the right of Fig. 1;

Fig. 3 is a top plan view of the ventilator itself; and

Fig. 4 is a cross section, taken on the line 4—4 of Fig. 3.

Referring to the drawings—

5 designates the floor, 6 the side wall, 7 the front side door, 8 the instrument board or dash, and 9 the windshield of a Ford or other automobile of generally similar build.

Referring to my improved ventilator, 10 designates a base or bottom plate that is suitably attached, preferably to the dash or instrument board 8 as by screws indicated at 11. The longitudinal edges of the base member 10 are folded upwardly and inwardly to form guide channels 12, as best shown in Fig. 4. Slidably mounted on the base plate 10 is a hollow member 13, having the lower edge portions of its side walls turned outwardly in the form of flanges 14 which are slidably engaged with the grooves or channels 12 of the base plate. The upper side wall of the hollow member 13 has a downwardly bent extension 15 (Figs. 1 and 4) which serves the function of a deflector to direct the inflowing current of air more or less downwardly into the foot space of the car. The parts being preferably made of sheet-metal, this tail-piece or deflector 15 may readily be bent to stand at any desired angle and thus vary the general direction of discharge of the inflowing air.

Pivotally mounted at 16 on the outer or upper end of the hollow member 13 is a hood or cowl 17 which can be adjusted between a maximum wind catching position shown by full lines in Fig. 3 and a minimum wind-catching position shown by dotted lines in the same figure. By providing a frictional engagement between the inner sides of the cowl and the outer surface of the tubular member 13, the cowl will readily remain fixed at any adjusted position; and preferably stop lugs or pins 18 and 19 are provided to limit the extreme outer and inner positions of the cowl. At times when no ventilation is required or desired, the tubular body member 13 is drawn downwardly and inwardly, as indicated by dotted lines in Fig. 1, which carries the cowl or wind catcher down behind the upper end of the base member 10, so that no air is caught and directed into the car. At times when ventilation is desired, the tubular body member 13 is pushed upwardly and outwardly, carrying the cowl 17 to a projecting position beyond the upper end of the base 10 and the cowl is then adjusted so as to catch and direct the desired amount of air downwardly into the car.

It is believed that the structural features and the manner of use of my improved ventilator will be readily understood from the illustration and the foregoing description, without further explanation. It should be understood, of course, that one of these ventilators may, and preferably will, be attached to each side of the car body, so as to ventilate the entire foot space of the front seat. Although I have shown the ventilator as attached to the instrument board or dash of the car, it is manifest that the particular point of attachment is immaterial and may be varied as the particular structure of the car itself or other conditions may determine.

I am aware that it has heretofore been proposed to provide a ventilator attachment comprising a projecting wind-catcher and a deflector for directing the air into the foot space all in one piece; but my present invention presents an improvement notably in two respects; first it can be put entirely into or out of action as desired; and, secondly, by adjusting the cowl, the extent or amount of ventilation can be nicely regulated.

Finally, it will be evident that the specific details of structure may be considerably modified without involving any departure from the principle of the invention or sacrificing any of the advantages thereof. For instance, I have shown a frictional sliding engagement of the movable member 13 on and with the stationary base 10 by means of the grooves 12 and flanges 14, but other engaging means between said parts may be used if desired. The tube or funnel may widen at the deflector end in a direction perpendicular to the plane of the base member, and the cowl can be formed as an integral part of the sliding member. Hence, I reserve all such variations and modifications as fall within the spirit and purview of the appended claims.

I claim:

1. A ventilator for automobiles, consisting of a base member adapted to be attached to the instrument board or dash, and a hollow member slidably mounted on said base member and carrying at its upper end a cowl adapted in one position of said hollow member to project beyond the edge of the instrument board or dash and in another position to lie behind the same.

2. A ventilator for automobiles, consisting of a base member adapted to be attached to the instrument board or dash, a hollow member slidably mounted on said base member, a cowl pivotally mounted on the outer end of said hollow member and adjustable to catch more or less wind; said hollow member and cowl being bodily movable into and out of wind-catching position.

3. A ventilator for automobiles, comprising a base plate formed with channel guides on its longitudinal edges, a hollow member having longitudinal flanges slidably engaged with said channel guides, and a cowl pivotally mounted on the outer end of said hollow member and adjustable to different wind-catching positions.

4. A ventilator for automobiles, comprising a base plate formed with channel guides on its longitudinal edges, a hollow member having longitudinal flanges slidably engaged with said channel guides, a cowl pivotally mounted on the outer end of said hollow member and adjustable to different wind-catching positions, and a deflector on the inner end of said hollow member for directing the inflowing air downwardly into the foot space.

HERMAN R. C. ANTHONY.